(12) United States Patent
Buford et al.

(10) Patent No.: US 8,855,665 B2
(45) Date of Patent: Oct. 7, 2014

(54) LOCATION PRIVACY ENFORCEMENT IN A LOCATION-BASED SERVICES PLATFORM

(75) Inventors: John Buford, Princeton, NJ (US); Venkatesh Krishnaswamy, Holmdel, NJ (US); Xiaotao Wu, Metuchen, NJ (US)

(73) Assignee: Avaya Inc., Basking Ridge, NJ (US)

( * ) Notice: Subject to any disclaimer, the term of this patent is extended or adjusted under 35 U.S.C. 154(b) by 363 days.

(21) Appl. No.: 12/484,094

(22) Filed: Jun. 12, 2009

(65) Prior Publication Data

US 2010/0151885 A1    Jun. 17, 2010

Related U.S. Application Data

(60) Provisional application No. 61/138,439, filed on Dec. 17, 2008.

(51) Int. Cl.
| | | |
|---|---|---|
| *H04M 11/04* | (2006.01) | |
| *H04M 3/42* | (2006.01) | |
| *H04W 24/00* | (2009.01) | |
| *H04W 4/02* | (2009.01) | |
| *H04L 29/06* | (2006.01) | |
| *H04L 29/08* | (2006.01) | |
| *H04W 4/20* | (2009.01) | |
| *H04W 12/08* | (2009.01) | |

(52) U.S. Cl.
CPC ............ *H04L 63/107* (2013.01); *H04W 4/02* (2013.01); *H04L 67/18* (2013.01); *H04W 12/08* (2013.01); *H04W 4/20* (2013.01)
USPC .............. 455/456.1; 455/456.3; 455/456.5; 455/456.6; 455/457; 455/404.2; 455/414.1

(58) Field of Classification Search
CPC ........ H04W 4/02; H04W 4/023; H04W 4/025; H04L 67/18; H04L 67/20; H04L 67/22; G06Q 30/0281
USPC .......... 455/456.3, 456.2, 456.1, 456.5, 456.6, 455/457, 404.1, 404.2, 414.1; 705/51, 10; 707/1
See application file for complete search history.

(56) References Cited

U.S. PATENT DOCUMENTS

| | | | |
|---|---|---|---|
| 5,214,757 | A | 5/1993 | Mauney et al. |
| 6,401,102 | B1 | 6/2002 | Ishii et al. |
| 6,614,352 | B2 | 9/2003 | Pellet et al. |
| 6,775,614 | B2 | 8/2004 | Kim |
| 6,816,735 | B1 | 11/2004 | Rayburn et al. |

(Continued)

OTHER PUBLICATIONS

Le, Danh C., "U.S. Appl. No. 12/211,579 Office Action Jun. 7, 2011", , Publisher: USPTO, Published in: US.

(Continued)

*Primary Examiner* — Dwayne Bost
*Assistant Examiner* — Nalini Mummalaneni

(57) ABSTRACT

A method for determining the privacy settings for location-based services without some of the disadvantages of the prior art is disclosed. This is done by establishing a session between the location generator and the location recipient. The session is created by a validator that is capable of keeping track of the rules for a stream of location objects created by a location generator. The validator determines what information to send to the location recipient without having to determine the rules for each location object and each location recipient every time a new location object is received by the location server.

8 Claims, 8 Drawing Sheets

(56) References Cited

U.S. PATENT DOCUMENTS

| | | |
|---|---|---|
| 6,823,256 B1 | 11/2004 | Burt |
| 6,848,542 B2 | 2/2005 | Gailey et al. |
| 6,871,137 B2 | 3/2005 | Scaer et al. |
| 6,912,545 B1 | 6/2005 | Lundy et al. |
| 6,915,211 B2 | 7/2005 | Kram et al. |
| 6,944,447 B2 | 9/2005 | Portman et al. |
| 6,947,976 B1 | 9/2005 | Devitt et al. |
| 6,968,179 B1 * | 11/2005 | De Vries ............... 455/414.1 |
| 7,007,013 B2 | 2/2006 | Davis, II et al. |
| 7,023,995 B2 | 4/2006 | Olsson |
| 7,024,205 B1 | 4/2006 | Hose |
| 7,031,724 B2 | 4/2006 | Ross et al. |
| 7,062,279 B2 | 6/2006 | Cedervall et al. |
| 7,072,665 B1 | 7/2006 | Blumberg et al. |
| 7,116,985 B2 | 10/2006 | Wilson et al. |
| 7,142,839 B2 | 11/2006 | Pelaez et al. |
| 7,181,227 B2 | 2/2007 | Wilson et al. |
| 7,190,960 B2 | 3/2007 | Wilson et al. |
| 7,197,322 B1 | 3/2007 | Rayburn et al. |
| 7,203,502 B2 | 4/2007 | Wilson et al. |
| 7,224,987 B1 * | 5/2007 | Bhela et al. ............... 455/456.3 |
| 7,228,140 B2 | 6/2007 | Anctil et al. |
| 7,231,218 B2 * | 6/2007 | Diacakis et al. ........... 455/456.1 |
| 7,236,799 B2 | 6/2007 | Wilson et al. |
| 7,263,086 B2 | 8/2007 | Viikari et al. |
| 7,272,393 B1 | 9/2007 | Wuthnow et al. |
| 7,305,245 B2 | 12/2007 | Alizadeh-Shabdiz |
| 7,305,365 B1 * | 12/2007 | Bhela et al. .................. 705/51 |
| 7,327,258 B2 | 2/2008 | Fast et al. |
| 7,333,820 B2 | 2/2008 | Sheha et al. |
| 7,349,768 B2 | 3/2008 | Bruce et al. |
| 7,355,508 B2 | 4/2008 | Mian et al. |
| 7,366,523 B2 | 4/2008 | Viikari et al. |
| 7,412,400 B1 * | 8/2008 | Bhela et al. ................ 705/1.1 |
| 7,460,149 B1 | 12/2008 | Donovan et al. |
| 8,046,004 B2 * | 10/2011 | Tsuchiya ................ 455/456.4 |
| 2002/0080968 A1 | 6/2002 | Olsson |
| 2002/0094822 A1 | 7/2002 | Anctil et al. |
| 2002/0126701 A1 | 9/2002 | Requena |
| 2002/0160766 A1 | 10/2002 | Portman et al. |
| 2002/0160772 A1 | 10/2002 | Gailey et al. |
| 2002/0161587 A1 | 10/2002 | Pitts, III et al. |
| 2002/0161627 A1 | 10/2002 | Gailey et al. |
| 2002/0161646 A1 | 10/2002 | Gailey et al. |
| 2002/0161647 A1 | 10/2002 | Gailey et al. |
| 2002/0169784 A1 | 11/2002 | Cha et al. |
| 2002/0176579 A1 | 11/2002 | Deshpande et al. |
| 2003/0036379 A1 | 2/2003 | Nikolai et al. |
| 2003/0080869 A1 | 5/2003 | Pellet et al. |
| 2003/0105587 A1 | 6/2003 | Kim |
| 2003/0171939 A1 | 9/2003 | Yagesh et al. |
| 2003/0191673 A1 * | 10/2003 | Cohen ........................... 705/5 |
| 2003/0202104 A1 | 10/2003 | Werner |
| 2003/0207683 A1 | 11/2003 | Lempio et al. |
| 2003/0212536 A1 | 11/2003 | Wang et al. |
| 2003/0216949 A1 | 11/2003 | Kram et al. |
| 2004/0019581 A1 | 1/2004 | Davis, II et al. |
| 2004/0087043 A1 | 5/2004 | Lee et al. |
| 2004/0092271 A1 | 5/2004 | Viikari et al. |
| 2004/0120323 A1 | 6/2004 | Viikari et al. |
| 2004/0148438 A1 | 7/2004 | Liscano |
| 2004/0192299 A1 | 9/2004 | Wilson et al. |
| 2004/0192339 A1 | 9/2004 | Wilson et al. |
| 2004/0192350 A1 | 9/2004 | Pelaez |
| 2004/0198397 A1 | 10/2004 | Weiss |
| 2004/0203883 A1 | 10/2004 | Jollis |
| 2004/0203900 A1 | 10/2004 | Cedervall et al. |
| 2004/0203901 A1 | 10/2004 | Wilson et al. |
| 2004/0203902 A1 | 10/2004 | Wilson et al. |
| 2004/0203903 A1 | 10/2004 | Wilson et al. |
| 2004/0203907 A1 * | 10/2004 | Hiller et al. ................ 455/456.1 |
| 2004/0203919 A1 | 10/2004 | Ross et al. |
| 2004/0225433 A1 | 11/2004 | Burt |
| 2004/0230467 A9 | 11/2004 | Gailey et al. |
| 2004/0235493 A1 | 11/2004 | Ekerborn |
| 2004/0243299 A1 | 12/2004 | Scaer et al. |
| 2004/0243417 A1 | 12/2004 | Pitts, III et al. |
| 2005/0027590 A9 | 2/2005 | Gailey et al. |
| 2005/0027591 A9 | 2/2005 | Gailey et al. |
| 2005/0034075 A1 | 2/2005 | Riegelman |
| 2005/0055353 A1 | 3/2005 | Marx et al. |
| 2005/0102180 A1 | 5/2005 | Gailey et al. |
| 2005/0130680 A1 | 6/2005 | Northcutt |
| 2005/0135264 A1 | 6/2005 | Popoff et al. |
| 2005/0143096 A1 | 6/2005 | Boesch |
| 2005/0143097 A1 | 6/2005 | Wilson et al. |
| 2005/0159216 A1 | 7/2005 | Chiu et al. |
| 2005/0221812 A9 | 10/2005 | Gailey et al. |
| 2005/0255861 A1 | 11/2005 | Wilson et al. |
| 2005/0272445 A1 * | 12/2005 | Zellner ...................... 455/456.2 |
| 2005/0286421 A1 | 12/2005 | Janacek |
| 2005/0289095 A1 * | 12/2005 | Rauhala et al. .................. 707/1 |
| 2006/0126601 A1 | 6/2006 | Kim et al. |
| 2006/0142027 A1 | 6/2006 | Krishnamurthi et al. |
| 2006/0189328 A1 | 8/2006 | Cedervall et al. |
| 2006/0217131 A1 | 9/2006 | Alizadeh-Shabdiz et al. |
| 2006/0270391 A1 | 11/2006 | Kim et al. |
| 2006/0270421 A1 | 11/2006 | Phillips et al. |
| 2007/0060171 A1 | 3/2007 | Sudit et al. |
| 2007/0118604 A1 | 5/2007 | Requena |
| 2007/0124472 A1 | 5/2007 | Requena |
| 2007/0149210 A1 | 6/2007 | McKiou et al. |
| 2007/0149212 A1 | 6/2007 | Gupta et al. |
| 2007/0202844 A1 | 8/2007 | Wilson et al. |
| 2007/0205888 A1 | 9/2007 | Lee et al. |
| 2007/0220038 A1 | 9/2007 | Crago |
| 2007/0244633 A1 | 10/2007 | Phillips et al. |
| 2007/0244750 A1 | 10/2007 | Grannan et al. |
| 2007/0270132 A1 | 11/2007 | Poosala |
| 2007/0270161 A1 | 11/2007 | Hampel et al. |
| 2007/0270163 A1 | 11/2007 | Anupam et al. |
| 2007/0270165 A1 | 11/2007 | Poosala |
| 2007/0270166 A1 | 11/2007 | Hampel et al. |
| 2008/0004043 A1 | 1/2008 | Wilson et al. |
| 2008/0046134 A1 | 2/2008 | Bruce et al. |
| 2008/0065774 A1 | 3/2008 | Keeler |
| 2008/0080486 A1 | 4/2008 | Kim et al. |
| 2008/0085724 A1 | 4/2008 | Cormier et al. |
| 2008/0114612 A1 | 5/2008 | Needham et al. |
| 2008/0154829 A1 | 6/2008 | Dalton |
| 2008/0227473 A1 * | 9/2008 | Haney ........................... 455/457 |
| 2008/0301175 A1 | 12/2008 | Applebaum et al. |
| 2009/0033746 A1 | 2/2009 | Brown et al. |
| 2009/0082038 A1 * | 3/2009 | McKiou et al. ............ 455/456.6 |
| 2009/0100018 A1 | 4/2009 | Roberts |
| 2009/0100459 A1 | 4/2009 | Riedl et al. |
| 2010/0030806 A1 | 2/2010 | Kuhlke et al. |
| 2011/0138006 A1 | 6/2011 | Stewart |

OTHER PUBLICATIONS

Le, Danh C., "U.S. Appl. No. 12/211,579 Restriction/Election Requirement Mar. 15, 2011", , Publisher: USPTO, Published in: US.

"Event Stream Processing", "Wikipedia http://en.wikipedia.org/w/index.php?title=Event_Stream_Processing&pri . . . ", Jun. 8, 2009, Publisher: Wikimedia Foundation, Inc.

Cuellar et al, "Geopriv Requirements", "Network Working Group—Informational http://www.ietf.org/rfc/rfc3693.txt", Feb. 2004, Publisher: The Internet Society.

Peterson, J., "A Presence-based GEOPRIV Location Object Format", "Network Working Group—Standards Track http://tools.ietf.org/html/rfc4119", Dec. 2005, Publisher: The Internet Society.

* cited by examiner

LOCATION PRIVACY ENFORCEMENT IN A LOCATION-BASED SERVICES PLATFORM

CROSS REFERENCE TO RELATED APPLICATIONS

This application claims the benefit of U.S. Provisional Application No. 61/138,439, filed Dec. 17, 2008, which is incorporated by reference.

This application is related to U.S. patent application Ser. No. 12/484,083, filed Jun. 12, 2009, entitled "Spatial-Temporal Event Correlation For Location-Based Services," which is incorporated by reference.

If there are any contradictions or inconsistencies in language between this application and the cases that have been incorporated by reference that might affect the interpretation of the claims in this case, the claims in this case should be interpreted to be consistent with the language in this case.

FIELD OF THE INVENTION

The present invention relates to telecommunications in general, and, more particularly, to location-based services.

BACKGROUND OF THE INVENTION

Location-based services are services provided based on the location of objects. The most prevalent location-based service is Enhanced 911 (or E911) services. The Enhanced 911 service provides 911 operators and emergency responders with information such as the identification of the person calling and the location of the caller. All mobile telephones sold in the United States today have this feature.

Location-based services include, for example and without limitation, satellite navigation devices that let a user know the location of the closest hospital or gas station to a user. Location-based services may also alert enterprises, such as gas stations, as to when a potential customer is within a certain distance. The enterprise may then send targeted advertisements to a traveler, such as discounts, etc.

Still other location-based services are targeted to the tracking of objects, such as, for example and without limitation, tracking of packages, tracking a fleet of vehicles, or determining the number of people who are in a given area for allotting government services where they may be most needed.

The problem is how to protect users' privacy as they use location-based services.

Protecting user privacy is done by a user creating a series of rules for access to the user's information. These rules set privacy settings based on, for example and without limitation, the recipient of the user's information, where the user may be located, the time, etc.

In the prior art, the privacy settings are maintained in a location-based privacy system such as the one in FIG. 3. In FIG. 2, object 201-1 (here a person) travels along path 202-1 through space 101-4, space 101-5, and space 101-3. As user 201-1 travels along this path, user 201-1 sends out "location objects" which indicate where the user is located. In accordance with the illustrative embodiment of the present invention, user 201-1 does this by the use of location generator 301, and user 201-1 has defined different location-based service privacy settings for each space.

Because of the different privacy settings, location-based privacy system 300 checks the rules for each location object to determine whether or not a given location recipient should receive each location object. Location server 302 checks with rule maker 304 to determine whether or not it should send the location object to location recipient 303.

SUMMARY OF THE INVENTION

The present invention provides a method determining the privacy settings for location-based services without some of the disadvantages of the prior art. This is done by establishing a session between the location generator and the location recipient.

The session is created by a validator that is capable of keeping track of the rules for a stream of location objects created by a location generator. The validator determines what information to send to the location recipient without having to determine the rules for each location object and each location recipient every time a new location object is received by the location server.

DETAILED DESCRIPTION

Figure 1:
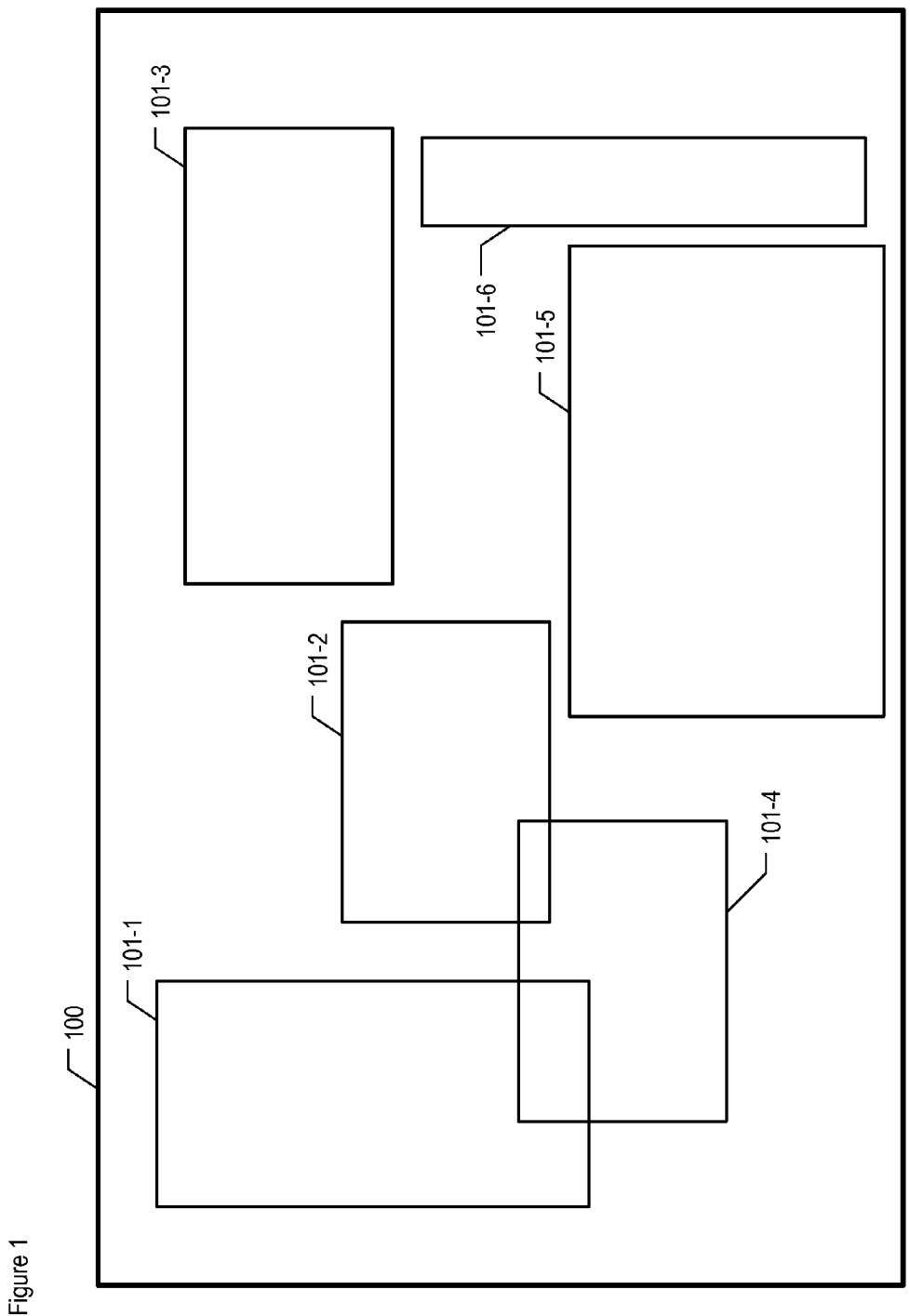
FIG. 1 depicts an illustrative map in accordance with the illustrative embodiment of the present invention.

FIG. 1 depicts illustrative map 100 in accordance with the illustrative embodiment of the present invention.

Map 100 is a rectangular area in which we are interested for the purposes of the illustrative embodiment of the present invention. Map 100 comprises areas 101-1 through 101-6.

Although, in accordance with the illustrative embodiment of the present invention, map 100 represents some physical space, it will be clear to one skilled in the art after reading this disclosure, how to make and use alternative embodiments of the present invention in the space is not a physical space, for example and without limitation, the space is instead a virtual space.

Although, in accordance with the illustrative embodiment of the present invention, map 100 represents space in two dimensions (2-D), it will be clear to one skilled in the art after reading this disclosure, how to make and use alternative embodiments of the present invention in the space is not a two dimensional (2-D) space but instead the space is any number of dimensions, for example and without limitation, three dimensions (3-D), four dimensions (4-D), etc.

Although map 100 is a rectangular area, it will be clear to one skilled in the art after reading this disclosure, how to make and use alternative embodiments of the present invention in which map 100 is any shape or any size.

Although areas 101-1 through 101-6 are a rectangular areas, it will be clear to one skilled in the art, after reading this disclosure, how to make and use alternative embodiments of the present invention in which areas 101-1 through 101-6 are any shape or any size.

Although areas 101-1 and 101-4 overlap, it will be clear to one skilled in the art, after reading this disclosure, how to make and use alternative embodiments of the present invention in which areas 101-1 and 101-4 do not overlap, overlap completely, or overlap with other areas.

Figure 2:
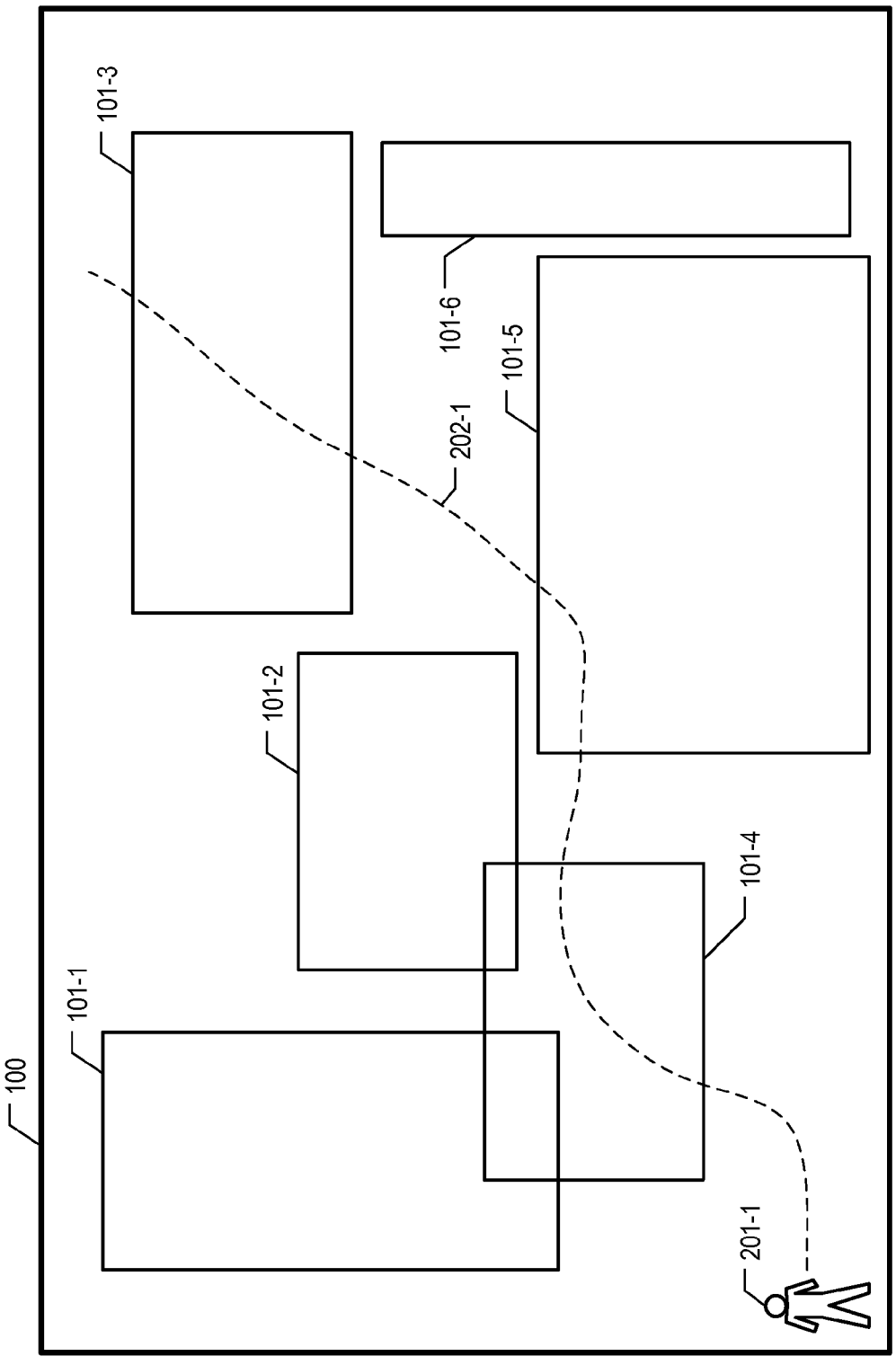
FIG. 2 depicts an illustrative map in accordance with the illustrative embodiment of the present invention.

Although areas 101-2 and 101-4 overlap, it will be clear to one skilled in the art, after reading this disclosure, how to make and use alternative embodiments of the present invention in which areas 101-2 and 101-4 do not overlap, overlap completely, or overlap with other areas. It will also be clear to one skilled in the art, after reading this disclosure, how to make and use alternative embodiments of the present invention FIG. 2 depicts map 100 in accordance with the illustrative embodiment of the present invention. Map 100 comprises areas 101-1 through 101-6, object 201-1, and path 202-1.

Although FIG. 2 depicts one object, it will be clear to one skilled in the art, after reading this disclosure, how to make and use alternative embodiments of the present invention in which there are any number of objects.

Although FIG. 2 depicts one path, it will be clear to one skilled in the art, after reading this disclosure, how to make and use alternative embodiments of the present invention in which there are any number of paths.

Although object 201-1 is depicted as a person, it will be clear to one skilled in the art, after reading this disclosure, how to make and use alternative embodiments of the present invention in which object 201-1 can be any object, for example, and without limitation: a person, a sensor, a vehicle, an animal, a telecommunications terminal, a stationary object, etc.

Although path 202-1 is depicted as going through areas 101-4, 101-5, and 101-3 of the map, it will be clear to one skilled in the art, after reading this disclosure, how to make and use alternative embodiments of the present invention in which path 202-1 can travel through any area of map 100.

Although object 201-1 is depicted as traveling along path 202-1, it will be clear to one skilled in the art, after reading this disclosure, how to make and use alternative embodiments of the present invention in which object 201-1 can travel along any path and through any area of map 100.

In accordance with the illustrative embodiment of the present invention, object 201-1 travels along path 202-1 through areas 101-4, 101-5, and 101-3 of map 100. As it travels along this path, the location object 201-1 is noted and tracked. In accordance with the illustrative embodiment of the present invention, the location is noted by satellite trilateralization, such as, for example, and without limitation, global positioning system (GPS). Other techniques for determining location include, for example and without limitation, triangulation of endpoints in cellular or wireless networks, proximal device broadcast, purchasing transactions (such as those by credit card or debit card), vehicle-to-vehicle networks, radio signals, etc. In accordance with the illustrative embodiment of the present invention, the location is then tracked by sending periodic updates through a wireless network, such as, for example and without limitation, a mobile telephone or data network, a packet radio network, a IEEE 802.11 (Wi-Fi) network, etc.

Figure 3:
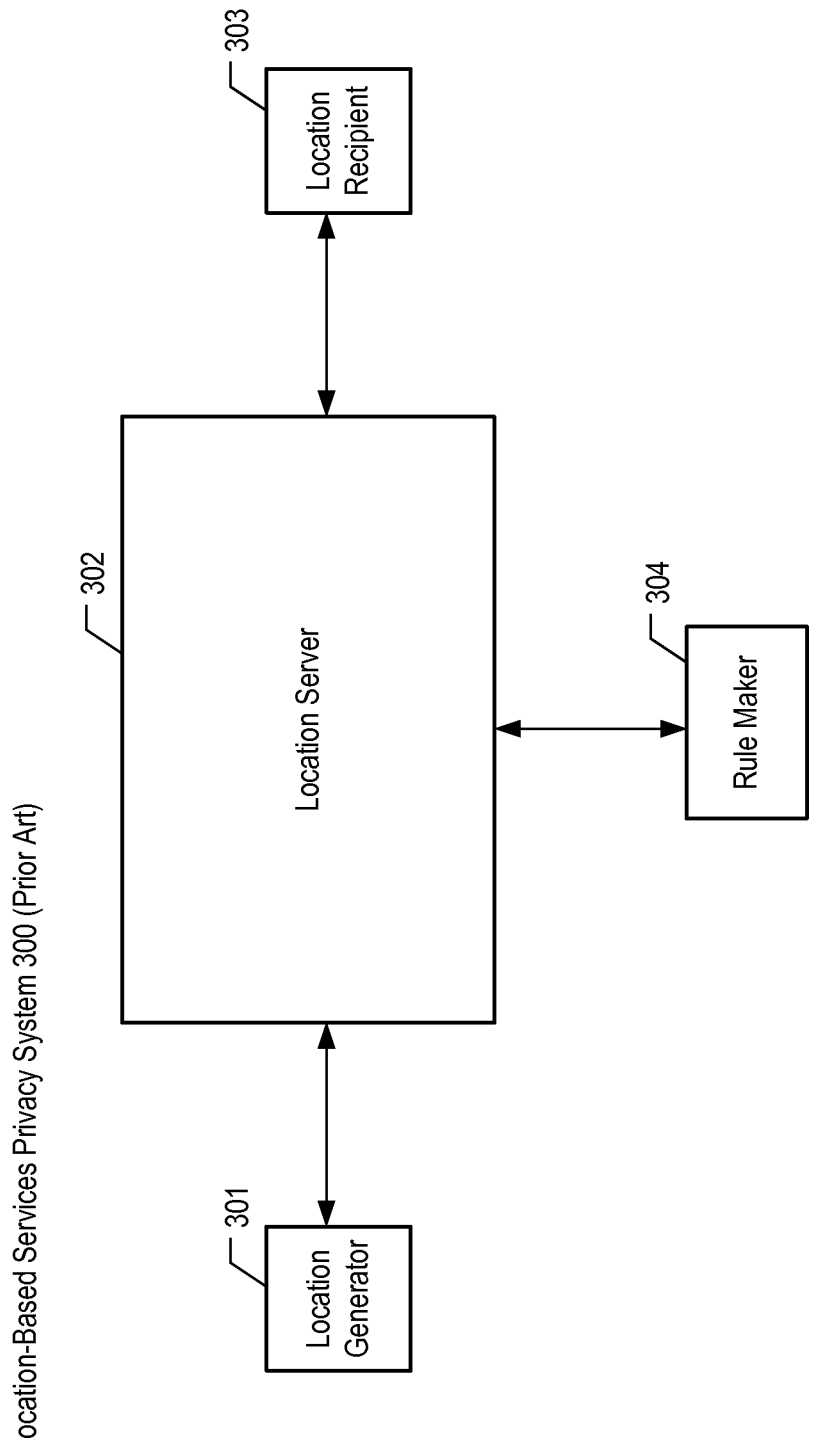
FIG. 3 depicts a schematic diagram of the salient components of location-based services privacy system 300 in accordance with the prior art.

FIG. 3 depicts a schematic diagram of the salient components of location-based services privacy system 300 in accordance with the prior art. FIG. 3 comprises location generator 301, location server 302, location recipient 303, and rule maker 304.

Figure 4:
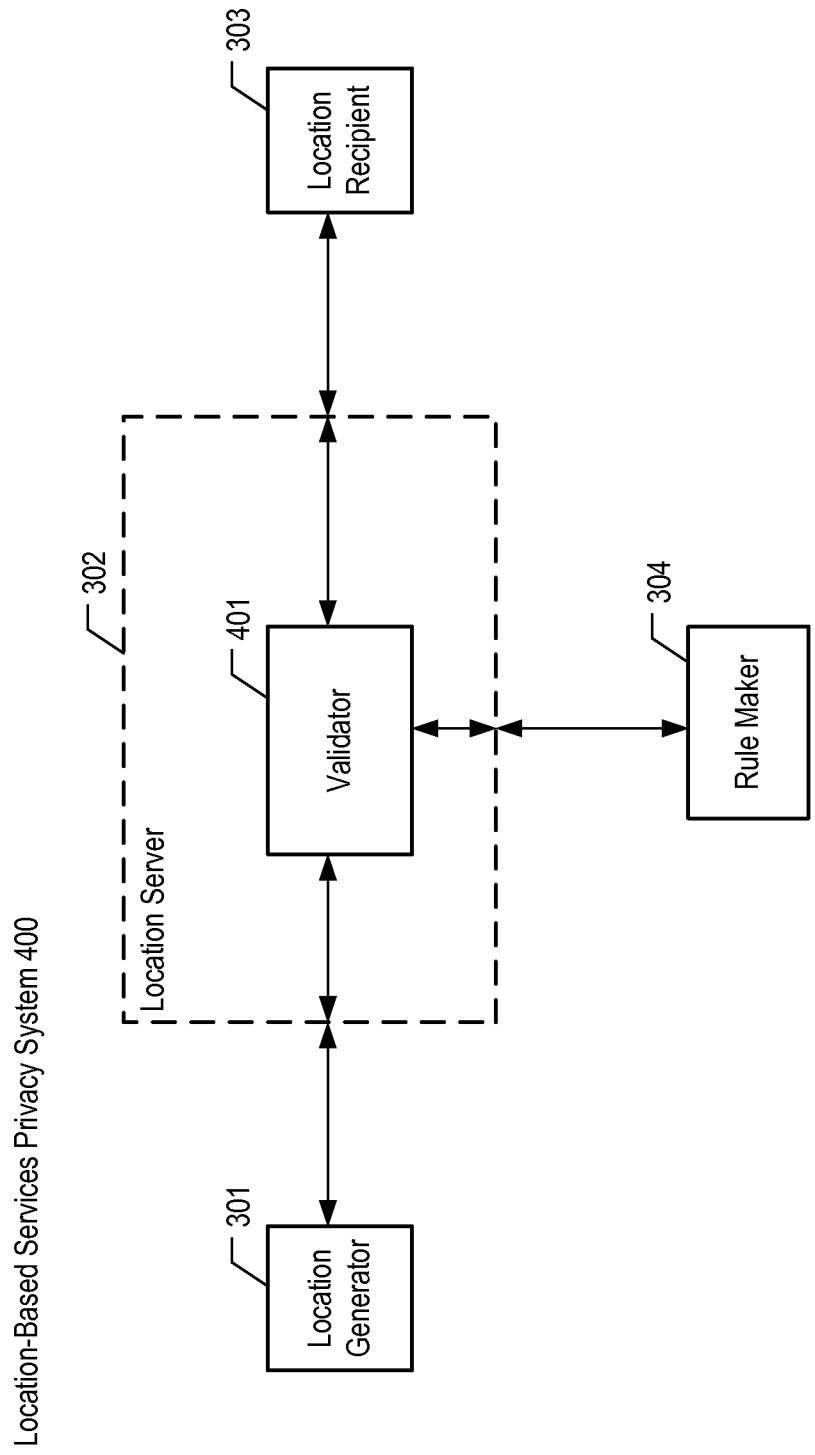
FIG. 4 depicts a schematic diagram of the salient components of location-based services privacy system 400 in accordance with the illustrative embodiment of the present invention.

FIG. 4 depicts a schematic diagram of the salient components of location-based services privacy system 400 in accordance with the illustrative embodiment of the present invention. FIG. 4 comprises location generator 301, location server 302, location recipient 303, rule maker 304, and validator 401.

For the purpose of this specification, a "location generator" is defined as any device (hardware and/or software) or event that provides an indication of its location. Examples of location generators include, for example and without limitation, global positioning system (GPS) receiver units, including those in mobile telecommunications terminals, triangulation of endpoints in cellular or wireless networks, purchasing transactions (such as those by credit card or debit card), vehicle-to-vehicle networks, radio signals, etc.

For the purpose of this specification, a "location recipient" is defined as any device (hardware and/or software) or person that receives the location information of a location generator. Examples of location recipients include, for example and without limitation, emergency service providers who use location information to locate people in need, a device used by a parent to track his or her child, providers of a location-based services, etc.

For the purpose of this specification, "location information" is defined as information regarding the location of a location generator. This includes, for example and without limitation, a location object, a subset of the information in a location object, the exact coordinates of a location generator, the name of a place of where a location generator is located, a street address, etc.

Although in accordance with the illustrative embodiment of the present invention, FIG. 4 comprises one location generator, it will be clear to one skilled in the art, after reading this disclosure, how to make and use alternative embodiments of the present invention in which there are any number of location generators.

Although in accordance with the illustrative embodiment of the present invention FIG. 4 comprises one location server, it will be clear to one skilled in the art, after reading this disclosure, how to make and use alternative embodiments of the present invention in which there are any number of location servers.

Although in accordance with the illustrative embodiment of the present invention, FIG. 4 comprises one rule maker, it will be clear to one skilled in the art, after reading this disclosure, how to make and use alternative embodiments of the present invention in which there are any number of rule makers.

Although in accordance with the illustrative embodiment of the present invention, FIG. 4 comprises one location recipient, it will be clear to one skilled in the art, after reading this disclosure, how to make and use alternative embodiments of the present invention in which there are any number of location recipients.

Although in accordance with the illustrative embodiment of the present invention, FIG. 4 comprises one validator, it will be clear to one skilled in the art, after reading this disclosure, how to make and use alternative embodiments of the present invention in which there are any number of validators.

Although in accordance with the illustrative embodiment of the present invention, validator 401 is inside of location server 302, it will be clear to one skilled in the art, after reading this disclosure, how to make and use alternative embodiments of the present invention in which validator 401 is located elsewhere, for example and without limitation, between location server 302 and location recipient 303, between location generator 301 and location server 302, etc.

In accordance with the illustrative embodiment of the present invention, validator 401 is implemented by the means of an event processor.

For the purpose of this specification, an "event processor" is defined as hardware and software that performs event processing, event filtering, and event correlation.

In accordance with the illustrative embodiment of the present invention, event processing refers to operations performed by an information system, for example and without limitation, operations to receive, distribute, store, modify, generate, or discard events. In accordance with the illustrative embodiment of the present invention, event filtering is a type of event processing in which an event is forwarded or blocked to a recipient based on a property of the event or some other computational context.

In accordance with the illustrative embodiment of the present invention, event correlation is a type of event processing in which an event is evaluated primarily with respect to other events but also system state or context, in order to produce related events. These related events ideally have the characteristics that there is a reduction in the volume of events and/or the information content of the new events is transformed to a more relevant value.

It will be clear to one skilled in the art, after reading this disclosure, how to make and use alternative embodiments of the present invention, in which validator 401 is implemented by another means.

Figure 5:
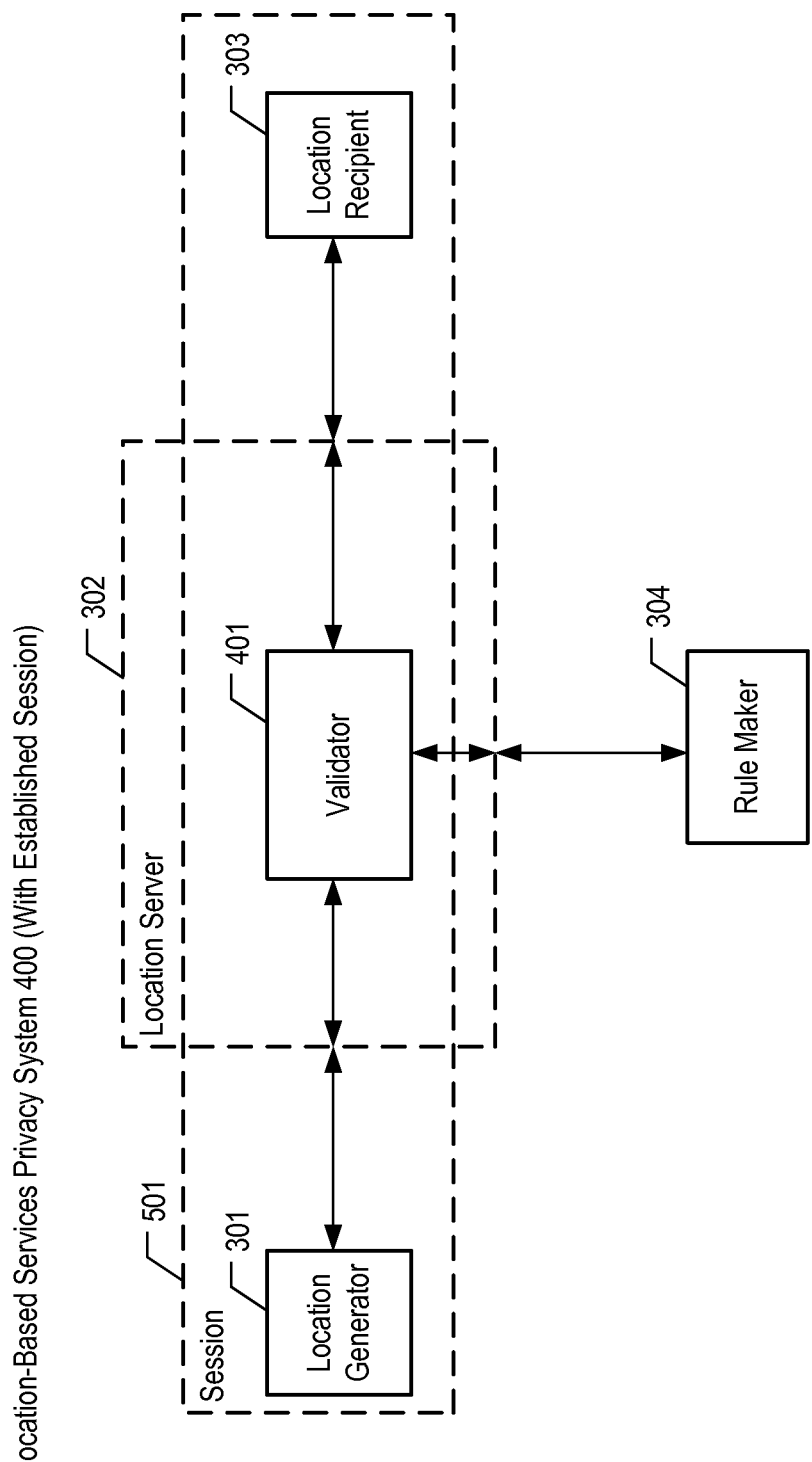
FIG. 5 depicts a schematic diagram of the salient components of location-based services privacy system 400 in accordance with the illustrative embodiment of the present invention.

FIG. 5 depicts a schematic diagram of the salient components of location-based services privacy system 400 in accordance with the illustrative embodiment of the present invention. FIG. 5 comprises location generator 301, location server 302, location recipient 303, rule maker 304, validator 401, and session 501.

Although in accordance with the illustrative embodiment of the present invention, FIG. 5 comprises one session, it will be clear to one skilled in the art, after reading this disclosure, how to make and use alternative embodiments of the present invention in which there are any number of sessions.

Although in accordance with the illustrative embodiment of the present invention, session 501 is between location generator 301, validator 401, and location recipient 303, it will be clear to one skilled in the art, after reading this disclosure, how to make and use alternative embodiments of the present invention in which the session may comprise other components, for example and without limitation, rule maker 304.

Although in accordance with the illustrative embodiment of the present invention, session 501 comprises one location generator, it will be clear to one skilled in the art, after reading this disclosure, how to make and use alternative embodiments of the present invention in which the session may comprise any number of location generators.

Although in accordance with the illustrative embodiment of the present invention, session 501 comprises one validator, it will be clear to one skilled in the art, after reading this disclosure, how to make and use alternative embodiments of the present invention in which the session may comprise any number of validators.

Although in accordance with the illustrative embodiment of the present invention, session 501 comprises one location recipient, it will be clear to one skilled in the art, after reading this disclosure, how to make and use alternative embodiments of the present invention in which the session may comprise any number of location recipients.

Figure 6:
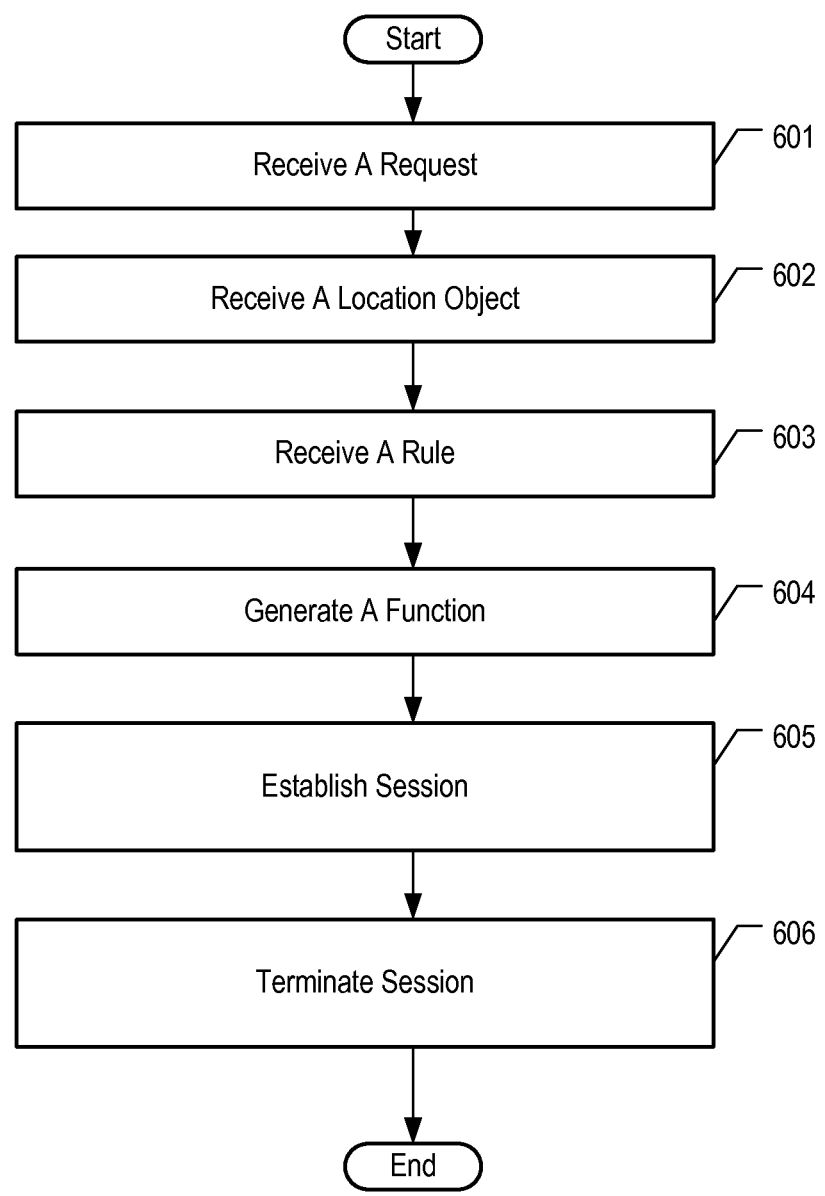
FIG. 6 depicts a flowchart of the salient tasks associated with the operation of the illustrative embodiment of the present invention.

FIG. 6 depicts a flowchart of the salient tasks associated with the operation of the illustrative embodiment of the present invention.

In accordance with the illustrative embodiment of the present invention, the tasks outlined in FIG. 6 are performed at validator 501. However, it will be clear to one skilled in the art, after reading this disclosure how to make and use other implementations of the present invention in which the some or all of the steps are performed by another device, for example, and without limitation, location generator 301, rule maker 304, a separate event processor, etc.

At task 601, validator 501 receives a first request. Although, in accordance with the illustrative embodiment of the present invention, this is received from location recipient 303, it will be clear to one skilled in the art, after reading this disclosure, how to make and use alternative embodiments of the present invention in which the first request received from another source.

In accordance with the illustrative embodiment of the present invention, the validator 501 will receive an indicium of the location generator as part of this request. In accordance with the illustrative embodiment of the present invention, an indicium of the location generator is some indication of where the location generator may be located. These are, for example, and without limitation, the name of the object to be located, the X and Y coordinates at which the object is located, a name for the place where the object is located (such as "home," "work," "school," etc.), a store where a purchase may have occurred, or any signal that may tell where the object is located.

At task 602, validator 501 receives a first location object. Although, in accordance with the illustrative embodiment of the present invention, the first location object is received from location recipient 303, it will be clear to one skilled in the art, after reading this disclosure, how to make and use alternative embodiments of the present invention in which the first request received from another source.

At task 603, validator 501 receives a first rule. Although, in accordance with the illustrative embodiment of the present invention, the first rule is received from rule maker 304, it will be clear to one skilled in the art, after reading this disclosure, how to make and use alternative embodiments of the present invention in which the first request received from another source.

At task 604, validator 501 generates a first function. This is further detailed in FIG. 7.

At task 605, validator 501 establishes a session between location object and location recipient. This step is further detailed in FIG. 8.

At task 606, a session is terminated when the conditions of the function are no longer met. For example and without limitation, if the condition of the function is "Let my spouse know my exact location after 9 p.m. and before 8 a.m.," and it is 8 a.m. the session between the location generator and the location recipient will be terminated. It will be clear to one skilled in the art, after reading this disclosure, how to make and use alternative embodiments of the present invention that perform task 606.

It will be clear to one skilled in the art, after reading this disclosure, how to make and use other implementations of the present invention in which one or more of the steps are omitted or are performed in a different order than the one presented or simultaneously.

Figure 7:
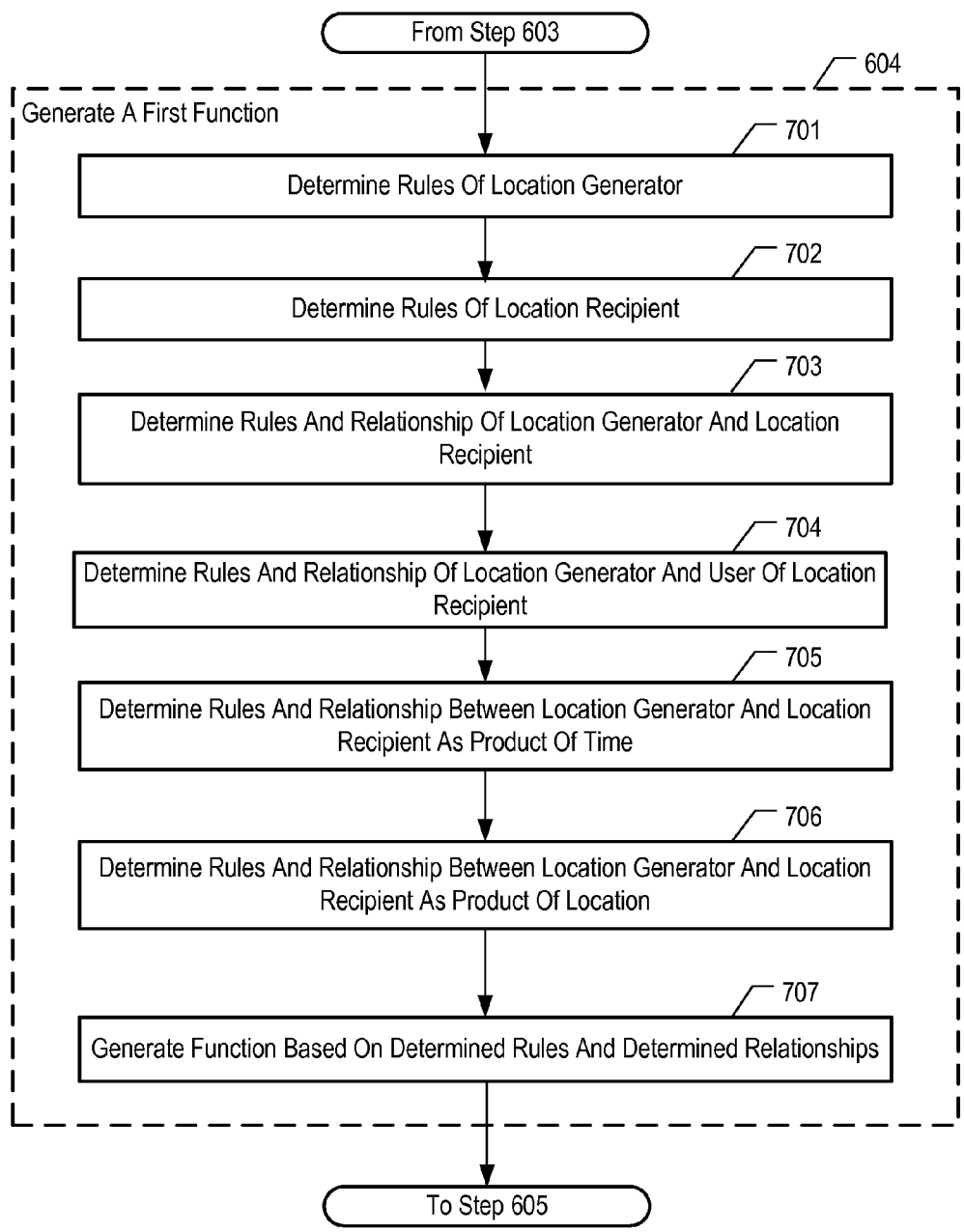
FIG. 7 depicts a flowchart of the salient tasks associated with the operation of task 604 in accordance with the illustrative embodiment of the present invention.

FIG. 7 depicts a flowchart of the salient tasks associated with the operation of task 604 in accordance with the illustrative embodiment of the present invention.

At task 701, the rules of location generator are determined. In accordance with the illustrative embodiment of the present invention, this task is performed based on the rules received from rule maker 304. In accordance with the illustrative embodiment of the present invention the location generator would have general rules relating to the dissemination of location information to other parties. For example and without limitation, a user of location generator 301 may want to prohibit the distribution of location objects to all parties (except for emergency services).

In accordance with the illustrative embodiment of the present invention, rules include, for example and without limitation, policies and settings that are set by the user, are default settings, or are set by some other party. These rules define the relationship between the components and parties.

At task 702, rules of location recipient are determined. In accordance with the illustrative embodiment of the present invention, this task is performed based on the rules received from rule maker 304. In accordance with the illustrative embodiment of the present invention, the location recipient would have general rules relating to the dissemination of location information to other parties. For example and without limitation, location recipient may be a large organization and only certain members of that group may be allowed access to location objects.

At task 703, the relationship of between location generator and location recipient is determined. In accordance with the illustrative embodiment of the present invention, this task is performed based on the rules received from rule maker 304. In accordance with the illustrative embodiment of the present invention, the location recipient would have general rules relating to the dissemination of location information to other parties based in particular on a relationship between the two parties. Examples of these relationship queries are, for example and without limitation, "Allow my friends know that I am within five miles of them," or "Let my spouse know my exact location," etc.

At task 704, the relationship of between location generator and a user of the location recipient is determined. In accordance with the illustrative embodiment of the present invention, this task is performed based on the rules received from rule maker 304. In accordance with the illustrative embodiment of the present invention, the location recipient would have general rules relating to the dissemination of location information to other parties based in particular on a relationship between the location generator and a user of the location recipient. Examples of these queries are, for example and without limitation, "Send my present location to the medical center, but only allow my physician to view my location," "Allow my supervisor and my assistant to know my location, but do not allow anyone else at my job to see my location," etc.

At task 705, the rules and relationship between location generator and location recipient as product of time are determined. In accordance with the illustrative embodiment of the present invention, this task is performed based on the rules received from rule maker 304. In accordance with the illustrative embodiment of the present invention, the location recipient would have general rules relating to the dissemination of location information to other parties based in particular on a relationship between the two parties as a product of time. Examples of these relationship queries are, for example and without limitation, "Allow my friends know my location during the weekend," "Let my spouse know my exact location after 9 p.m. and before 8 a.m.," "Allow my employer to know my location within 500 meters between the hours of 8:30 am and 5:30 pm.," etc.

At task 706, rules and relationship between location generator and location recipient as product of location is determined. In accordance with the illustrative embodiment of the present invention, this task is performed based on the rules received from rule maker 304. In accordance with the illustrative embodiment of the present invention, the location recipient would have general rules relating to the dissemination of location information to other parties based in particular on a relationship between the two parties as a product of location. Examples of these relationship queries are, for example and without limitation, "Allow my friends know that I am within five miles of them," "Let my spouse know my exact location unless I am in Atlantic City," "Allow my employer to know whether or not I am at a work site," etc.

At task 707, the function based on determined rules and determined relationships is generated. It will be clear to one skilled in the art, after reading this disclosure that the generated function is capable of handling operations that are combinations of the above operations, for example and without limitation, "Send my location to the medical center, on Monday between 9 am and 5 pm, when I am in New Jersey, and only allow physician to view this information," "Allow my spouse to view my location only when I am within 5 miles of my home Monday through Friday, but do not allow other members of my household to view this information," etc. It will be clear to one skilled in the art, after reading this disclosure, how to make and use alternative embodiments of the present invention in which task 707 is performed.

In accordance with the illustrative embodiment of the present invention, the following examples, without limitation, are those in which rules of the present invention are enacted using Extensible Markup Language (XML). It will be clear to one skilled in the art, after reading this disclosure, how to make and use alternative embodiments of the present invention in which a different language is used.

The following example is one in which some hotels to are permitted access to the user's location when the user is at an airport, regardless of the airport's location.

```
<rule id="NM32848">
    <conditions>
        <identity>
            <one domain="hertz.com"/>
            <one domain="avis.com"/>
            <one domain="budget.com"/>
        </identity>
        <gp:location-condition>
            <gp:location profile="rpid-condition">
                <rpid:place-type>
                    <lt:airport/>
                </rpid:place-type>
            </gp:location>
        </gp:location-condition>
    </conditions>
    <transformations/>
</rule>
</ruleset>
```

Example 1

Access to User Location at Airport

In the following example "sphere" is to allows user bob@example.net to access the user's location information. This rule keeps valid even if the user's home moves.

```
<rule id="NM32848">
    <conditions>
        <identity>
            <many>
                <except id="sip:bob@example.net"/>
            </many>
        </identity>
        <gp:location-condition>
            <gp:location profile="rpid-condition">
                <rpid:sphere>
                    <rpid:home/>
                </rpid:sphere>
            </gp:location>
        </gp:location-condition>
    </conditions>
    <transformations/>
</rule>
```

Example 2

Granting Access to User's Location Based on "Sphere"

It will be clear to one skilled in the art, after reading this disclosure, how to make and use other implementations of the present invention in which one or more of the steps are omitted or are performed in a different order than the one presented or simultaneously.

Figure 8:
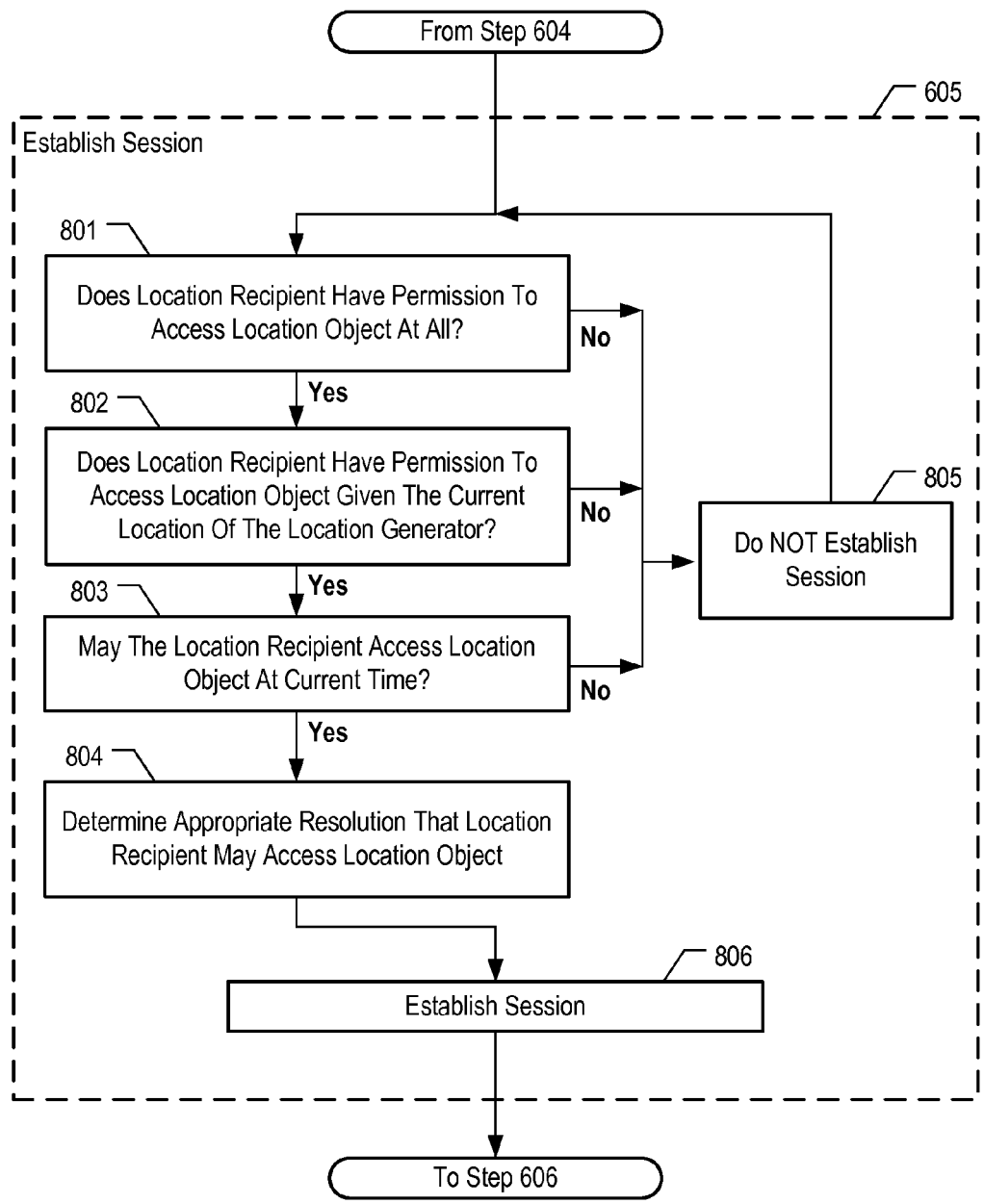
FIG. 8 depicts a flowchart of the salient tasks associated with the operation of task 605 in accordance with the illustrative embodiment of the present invention.

FIG. 8 depicts a flowchart of the salient tasks associated with the operation of task 605 in accordance with the illustrative embodiment of the present invention. In accordance with the illustrative embodiment of the present invention, task 801 through task 806 are performed by the function at validator 401. It will be clear to one skilled in the art, after reading this disclosure, how to make and use alternative embodiments of the present invention in which task 801 through task 806 are performed elsewhere.

Although, in accordance with the illustrative embodiment of the present invention, FIG. 8 depicts four tests to determine permissions between location generator 301 and location recipient 303, it will be clear to one skilled in the art, after reading this disclosure, how to make and use alternative embodiments of the present invention, in which any number of tests are performed.

At task 801, the function determines whether the location recipient has any permission to access the location object. If it does have permission, the decision process proceeds to task 802. If it does not, it proceeds to task 805.

At task 802, the function determines whether the location recipient has permission to access location object given the current or other location of the location generator. If it does have permission, the decision process proceeds to task 803. If it does not, it proceeds to task 805.

At task 803, the function determines whether the location recipient has permission to access the location object at current or other time. If it does have permission, the decision process proceeds to task 804. If it does not, it proceeds to task 805.

At task 804, the function determine the appropriate resolution that location recipient may access location object. In accordance with the illustrative embodiment of the present invention, different location recipients have different permissions regarding the exactness of the location of the location generator. For example, and without limitation, a location generator may give permissions such as, "Allow my friends know that I am within five miles of them, but do not inform them of my location" "Let my spouse know my exact location," or "Allow my employer to know that I am in New Jersey, but do not give my employer my exact location," etc.

At task 805, a session is NOT established. Although in accordance with the illustrative embodiment of the present invention, after task 805, the system returns to step 801, it will be clear to one skilled in the art, after reading this disclosure, how to make and use alternative embodiments of the present invention where the system proceeds to another point, for example and without limitation, the system proceeds to the end point.

At task 806, a session is established. it will be clear to one skilled in the art, after reading this disclosure, how to make and use alternative embodiments of the present invention that perform task 806.

It will be clear to one skilled in the art, after reading this disclosure how to make and use other implementations of the present invention in which one or more of the steps are omitted or are performed in a different order than the one presented or simultaneously.

It is to be understood that the disclosure teaches just one example of the illustrative embodiment and that many variations of the invention can easily be devised by those skilled in the art after reading this disclosure and that the scope of the present invention is to be determined by the following claims.

What is claimed is:

1. A method comprising:
   receiving, by a location server, a request from a first device for current location information of a second device at an instance in time;
   receiving, by the location server, the current location information from the second device, the current location information comprising location coordinates of the second device;
   accessing by the location server, rules associated with the first device and the second device, the rules comprising (i) permissions for the first device and the second device for dissemination of location information, (ii) granularity of the location information based on a relationship between the first device and the second device, and (iii) a predetermined time duration comprising a start time and a stop time during which the location information can be disseminated;
   when the first device has permission to access the location information, the second device has permission to share the location information with the first device, and the instance in time is within the start time and the stop time:
      establishing an active session between the first device and the second device when, based on the location coordinates, a distance between the first device and the second device is within a threshold distance;
      granting the first device access to the location coordinates of the second device when, based on the rules, the first device satisfies a first relationship with the second device;
      granting the first device access to general location information of the second device when, based on the rules, the first device satisfies a second relationship with the second device; and
      restricting the first device from accessing the currently location information of the second device when, based on the rules, the first device satisfies a third relationship with the second device;
      maintaining the active session and the access to the current location information when the distance is outside the threshold distance; and
      revoking the access and terminating the active session upon meeting the stop time;

when (i) the first device does not have permission to access the location information, (ii) the second device does not have permission to share the location information with the first device, or (iii) the instance in time is outside the time duration:
not establishing an active session between the first device and the second device and denying the first device access to the current location information of the second device.

2. The method of claim 1, wherein granting the first device the access to the location coordinates comprises:
allowing the first device to receive exact location coordinates of the second device.

3. The method of claim 1, wherein the access is restricted based on an identity associated with the first device.

4. The method of claim 1, wherein the predetermined time duration further comprises one of an allowed time or a not allowed time.

5. The method of claim 1, wherein the first device belongs to a member of a business organization.

6. A system comprising:
a processor operable;
to perform operations comprising:
receiving, by a location server, a request from a first device for current location information of a second device at an instance in time;
receiving, by the location server, the current location information from the second device, the current location information comprising location coordinates of the second device;
accessing by the location server, rules associated with the first device and the second device, the rules comprising (i) permissions for the first device and the second device for dissemination of location information, (ii) granularity of the location information based on a relationship between the first device and the second device, and (iii) a predetermined time duration comprising a start time and a stop time during which the location information can be disseminated;
when the first device has permission to access the location information, the second device has permission to share the location information with the first device, and the instance in time is within the start time and the stop time:
establishing an active session between the first device and the second device when, based on the location coordinates, a distance between the first device and the second device satisfies is within a threshold distance;
granting the first device access to the location coordinates of the second device when, based on the rules, the first device satisfies a first relationship with the second device;
granting the first device access to general location information of the second device when, based on the rules, the first device satisfies a second relationship with the second device; and
restricting the first device from accessing the current location information of the second device when, based on the rules, the first device satisfies a third relationship with the second device;
maintaining the active session and the access to the current location information when the distance is outside the threshold distance; and
revoking the access and terminating the active session upon meeting the stop time;
when (i) the first device does not have permission to access the location information, (ii) the second device does not have permission to share the location information with the first device, or (iii) the instance in time is outside the time duration:
not establishing an active session between the first device and the second device and denying the first device access to the current location information of the second device.

7. The system of claim 6, wherein the access is restricted based on an identity associated with the first device.

8. The system of claim 6, wherein the first device is associated with a business.

* * * * *